United States Patent
Cegnar

(10) Patent No.: US 8,938,899 B2
(45) Date of Patent: Jan. 27, 2015

(54) LIGHT APPARATUSES AND LIGHTING SYSTEMS

(71) Applicant: Erik J. Cegnar, Moscow, ID (US)

(72) Inventor: Erik J. Cegnar, Moscow, ID (US)

( * ) Notice: Subject to any disclaimer, the term of this patent is extended or adjusted under 35 U.S.C. 154(b) by 12 days.

(21) Appl. No.: 13/631,012

(22) Filed: Sep. 28, 2012

(65) Prior Publication Data

US 2013/0291414 A1  Nov. 7, 2013

Related U.S. Application Data

(60) Provisional application No. 61/541,020, filed on Sep. 29, 2011.

(51) Int. Cl.
*G09F 21/02* (2006.01)
*G03B 15/02* (2006.01)
*G03B 15/06* (2006.01)

(52) U.S. Cl.
CPC .............. *G03B 15/02* (2013.01); *G03B 15/06* (2013.01); *Y10S 362/80* (2013.01)
USPC .................. 40/559; 40/560; 40/561; 40/562; 362/249.02; 362/277; 362/235; 362/800; 362/244; 362/153

(58) Field of Classification Search
CPC ........ G03B 15/05; G03B 15/02; G03B 15/06; G09F 21/02; F21V 5/04; F21V 13/04
USPC ............... 40/559, 560, 561, 562; 362/249.02, 362/277, 153, 235, 800, 244
See application file for complete search history.

(56) References Cited

U.S. PATENT DOCUMENTS

| | | | |
|---|---|---|---|
| 7,116,485 B2 | 10/2006 | Po-Hung et al. | |
| RE39,900 E | 10/2007 | Hein et al. | |
| 7,648,256 B2 | 1/2010 | Shiratsuchi et al. | |
| 7,752,792 B2 | 7/2010 | Hsieh et al. | |
| 7,896,522 B2* | 3/2011 | Heller et al. | 362/249.02 |
| 8,444,297 B2* | 5/2013 | Lee et al. | 362/249.02 |
| 2003/0099115 A1 | 5/2003 | Reill | |
| 2004/0055191 A1* | 3/2004 | Kresser | 40/560 |
| 2004/0118026 A1 | 6/2004 | Yeh | |
| 2008/0151052 A1 | 6/2008 | Erel et al. | |
| 2008/0186703 A1 | 8/2008 | Lou et al. | |

(Continued)

FOREIGN PATENT DOCUMENTS

| | | |
|---|---|---|
| JP | 11-134916 | 5/1999 |
| KR | 10-2005-0034023 | 4/2005 |

(Continued)

OTHER PUBLICATIONS

"Lens (optics)", Sep. 11, 2012, pp. 14: http://en.wikipedia.org/wiki/Lens_(optics).
Neptun LED Product, 1 page, May 14, 2012: http://www.neptunlight.com/productdetails/63/186/adposter-i-led-billboard-fixture.html.

*Primary Examiner* — Syed A Islam
(74) *Attorney, Agent, or Firm* — Wells St. John P.S.

(57) ABSTRACT

Light apparatuses and lighting systems are described. According to one aspect, a light apparatus includes a plurality of light sources individually configured to emit light in a respective primary direction, and wherein the light sources are configured such that the primary directions of the light emitted by the light sources are at different angles with respect to a common plane, and a lens configured to direct the light from the light sources to a surface of an object which is to be illuminated.

26 Claims, 11 Drawing Sheets

(56) References Cited

U.S. PATENT DOCUMENTS

2009/0145010 A1    6/2009   Chung et al.
2010/0133850 A1    6/2010   Winkler
2010/0328466 A1   12/2010   Erel et al.
2013/0155671 A1*   6/2013   Kurt et al. .................... 362/231

FOREIGN PATENT DOCUMENTS

KR           10-1053785        8/2011
WO  PCT/US2012/058012          2/2013

* cited by examiner

US 8,938,899 B2

LIGHT APPARATUSES AND LIGHTING SYSTEMS

RELATED PATENT DATA

This application claims priority to a U.S. Provisional Patent Application Ser. No. 61/541,020, filed Sep. 29, 2011, entitled "Illumination Device", the disclosure of which is incorporated herein by reference.

TECHNICAL FIELD

This disclosure relates to light apparatuses and lighting systems.

BACKGROUND OF THE DISCLOSURE

Billboard and signage is a well established industry which has typically used lighting systems such as high intensity discharge (HID) or other conventional means of illumination. These systems typically consist of a flood type light which is quasi-directional by using crude reflectors to cast light generally toward the direction of the target. The result is an effective, yet generally inefficient form of lighting where much of the light rays are not incident on the target. This results a less efficient system because much more light needs to be produced than what is actually used to illuminate the target. The extra light that does not hit the illumination target travels into the sky and onto the surrounding objects. In the case of a billboard light where the proximity of the billboard is often close to a road, the extra light can be a distraction to drivers. Additionally, the light which reflects off of non-target objects and light which travels directly from the light source into the sky contributes significantly to light pollution and is currently a subject of regulatory debate. The wasted light from these conventional lighting systems also requires electrical power to produce this unused light. Therefore, light fixtures which produce unused light also waste electricity.

Recently, billboard and signage lights have utilized light emitting diodes (LEDs) to produce light for the purpose of illumination. These lights use LEDs instead of HID in a fixture which is fundamentally similar to a conventional HID lighting fixture. The LEDs may be positioned in a fixture generally pointed toward the target with crude reflectors such that a flood type pattern is formed and cast upon the target. This type of light has the same result as a conventional HID fixture where much of the light is not incident on the actual target. Similar to the conventional HID fixture, this type of LED light produces wasted light and results in wasted electricity. Additionally the center of the billboard near the light is significantly brighter than the edges.

At least some aspects of the disclosure are directed to light apparatus and light systems as described in detail herein.

BRIEF DESCRIPTION OF THE DRAWINGS

Exemplary embodiments of the disclosure are described below with reference to the following accompanying drawings.

DETAILED DESCRIPTION OF THE DISCLOSURE

This disclosure is submitted in furtherance of the constitutional purposes of the U.S. Patent Laws "to promote the progress of science and useful arts" (Article 1, Section 8).

The following description and the referenced drawings provide illustrative examples of the disclosure. As such, the embodiments discussed herein are merely examples in nature and are not intended to limit the scope of the disclosure, or its protection, in any manner. Rather, the description and drawings describe various example embodiments of the disclosure.

At least some aspects of the disclosure are directed to lighting systems which cast a substantially uniform light pattern upon a target, such as an advertising surface of a billboard, signage or other target to be illuminated. Example lighting systems include a plurality of light sources which individually emit light towards a lens to focus and direct the light toward the target. Different geometries of light sources and different lens configurations may be utilized to emit light having different shapes for illuminating target surfaces of different shapes in some embodiments. In addition, the shape of the emitted light may be tailored in some implementations to provide reduced spill light and light trespass and increased coefficient of use.

According to one embodiment, a light apparatus comprises a plurality of light sources individually configured to emit light in a respective primary direction, and wherein the light sources are configured such that the primary directions of the light emitted by the light sources are at different angles with respect to a common plane, and a lens configured to direct the light from the light sources to a surface of an object which is to be illuminated.

According to an additional embodiment, a light apparatus comprises a plurality of light sources individually configured to emit light in a respective primary direction, a lens comprising a curved input surface which is configured to receive the light from the light sources and an output surface which is configured to direct the light from the light sources to a surface of an object which is to be illuminated, and wherein the primary directions of the light emitted by at least some of the light sources are substantially orthogonal to a plurality of different locations of the curved input surface of the lens.

According to another embodiment, a lighting system comprises a lighting system configured to emit light in a defined shape which is different than a shape of a surface of an object which is to be illuminated and a mount configured to position the lighting system with respect to the surface of the object which is to be illuminated such that the shape of the light which is emitted from the lighting system substantially corresponds to the shape of the surface of the object when the light is received at the surface of the sign.

Figure 1:
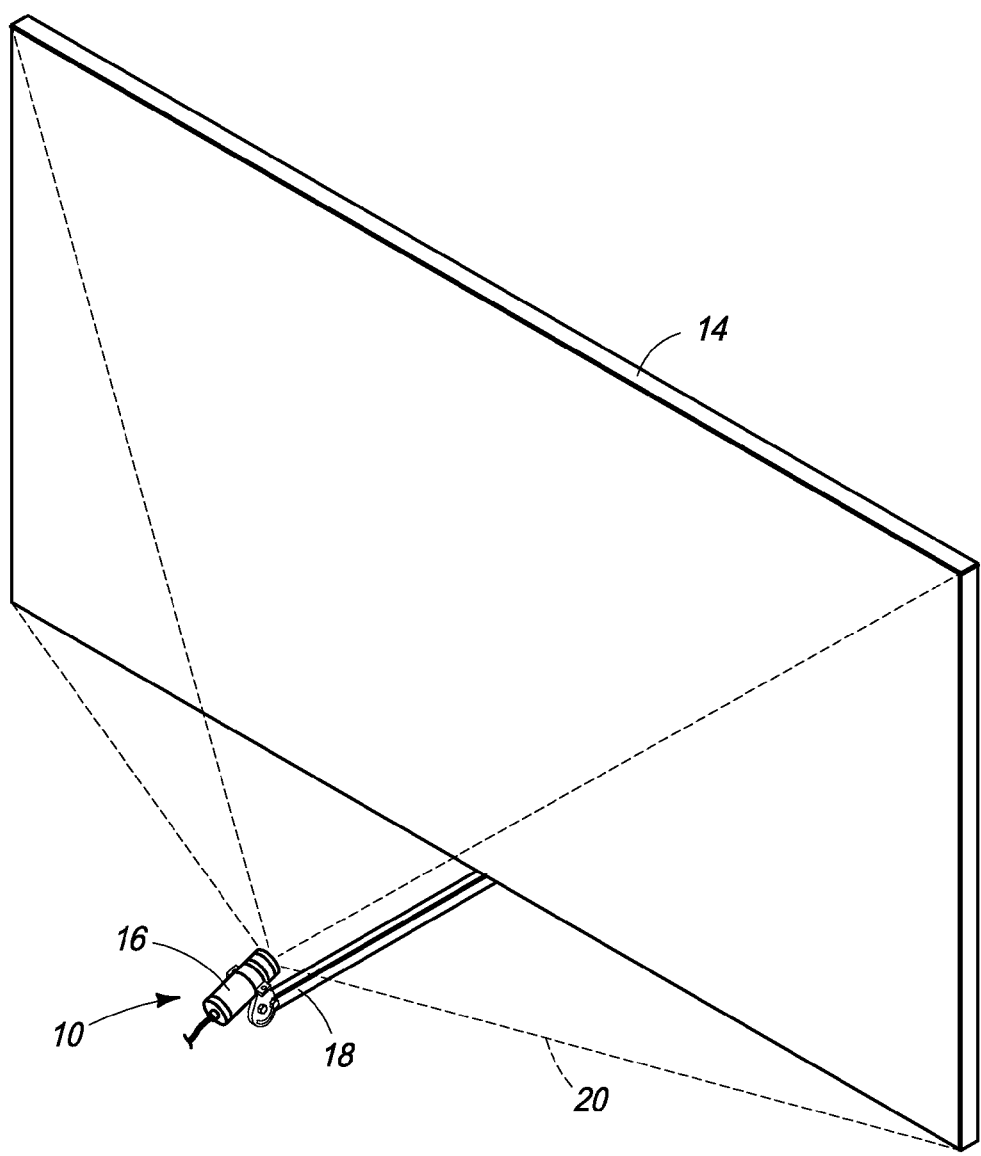
FIG. 1 is an illustrative representation of a lighting system according to one embodiment.

Referring to FIG. 1, a lighting system 10 is shown according to one embodiment. The lighting system 10 is configured to emit light 20 to illuminate a target (i.e., a specific surface or portion of an object 14 to be illuminated). In the depicted example implementation, object 14 is a sign, such as a billboard, and the target is an advertising/front surface of object 14. Although only one lighting system 10 is shown in FIG. 1, a plurality of lighting systems 10 may be utilized together in other implementations to provide adequate illumination of the target. Lighting system 10 may be used in other lighting applications, such as scene lighting or traffic sign lighting in other implementations.

In one embodiment, lighting system 10 includes a light apparatus 16 and a mount 18. Light apparatus 16 is configured to generate and emit the light 20 which is utilized to illuminate the object 14 and different example embodiments of light apparatus 16 are described in detail below. Mount 18 is configured to appropriately position the light apparatus 16 with respect to the object 14 to illuminate desired portions of the object 14. In the depicted example embodiment, mount 18 is attached to a support structure below and at the perimeter of the object 14 and positions light apparatus 16 to emit light upwardly from the perimeter of the object 14 towards the target (e.g., the target is an advertising surface of object 14 in the illustrated billboard example). Other mounting configurations are possible.

Lighting system 10 is configured to reduce spill light (i.e., emitted light that falls outside of the intended illumination target), and light trespass (i.e., spill light that is cast into unwanted areas) and provide an increased coefficient of use (i.e., a ratio of the amount of produced light which illuminates the target and a total amount of produced light) compared with some conventional illumination arrangements.

Figure 2:
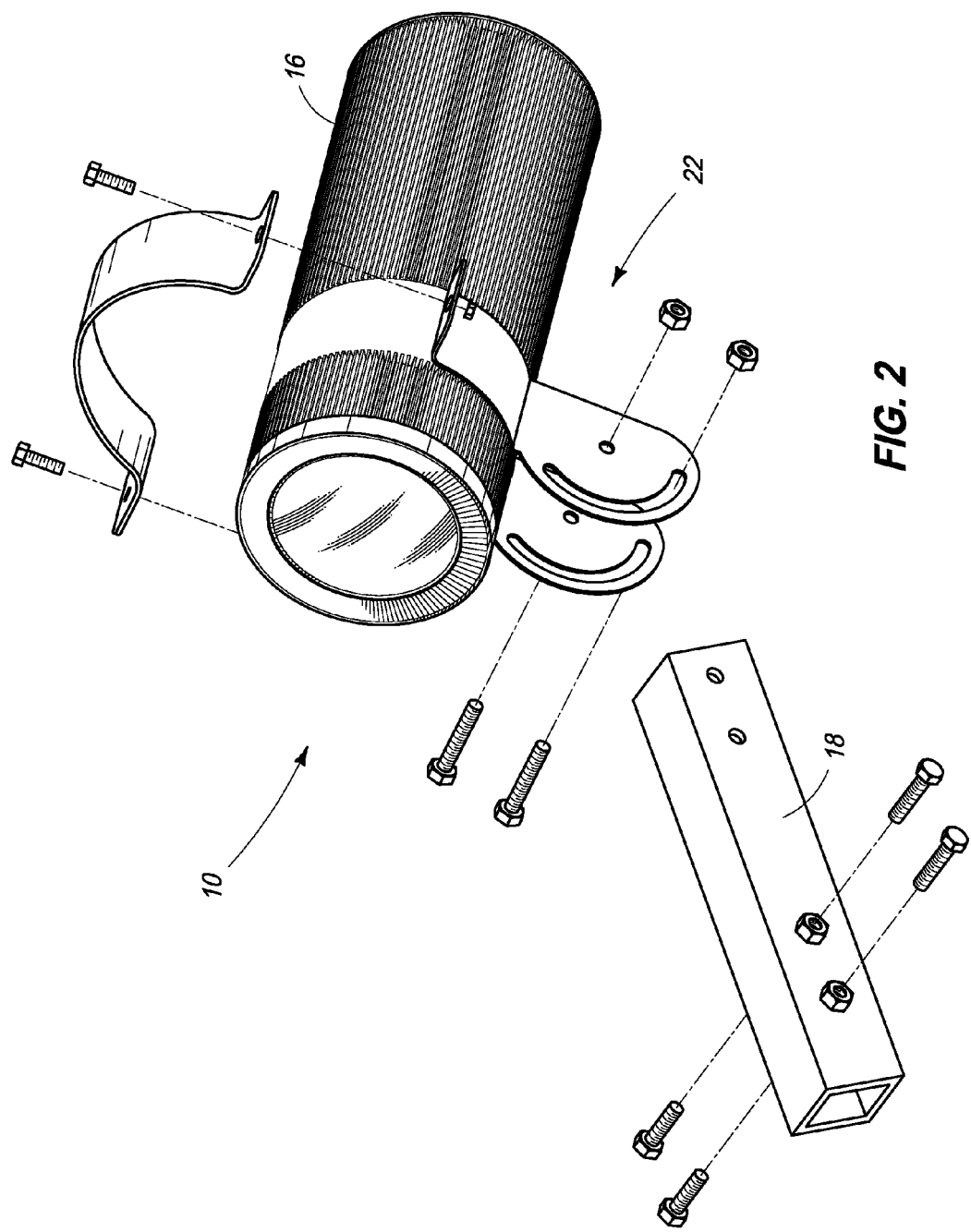
FIG. 2 is an exploded perspective view of a lighting system according to one embodiment.

Referring to FIG. 2, additional details of the lighting system 10 are shown according to one embodiment. Mount 18 may be affixed to a support structure at an appropriate location for the light apparatus 16 to illuminate a desired target. In one example mentioned above, the mount 18 may be affixed to a support structure of a billboard. In a more specific example, the mount 18 may position the light apparatus 16 centered and adjacent to a bottom portion of the billboard, as shown in FIG. 1.

An angular adjustment system 22 may be coupled with light apparatus 16 and configured to permit adjustment of the angle of the light apparatus 16 relative to the advertising surface of the billboard. In one embodiment for illuminating a 12'×24' billboard, the mount 18 is configured to position light apparatus 16 approximately 42-72 inches in front of the surface of the billboard, approximately 6-12 inches below the surface of the billboard (or above the surface for a downward facing mount) and at an upward angle of light apparatus 16 toward the surface of the billboard approximately 25-30 degrees from a horizontally-extending mount 18. The depicted arrangement for mounting a light apparatus 16 is one example and other mounting systems may be used in other embodiments. In addition, additional light apparatuses 16 may be used to illuminate larger signs or other objects 14 and may be evenly spaced from one another in one embodiment.

In this described embodiment, light apparatus 16 is positioned to illuminate the surface of the sign from the same side from which the sign is viewed by the public.

Figure 3:
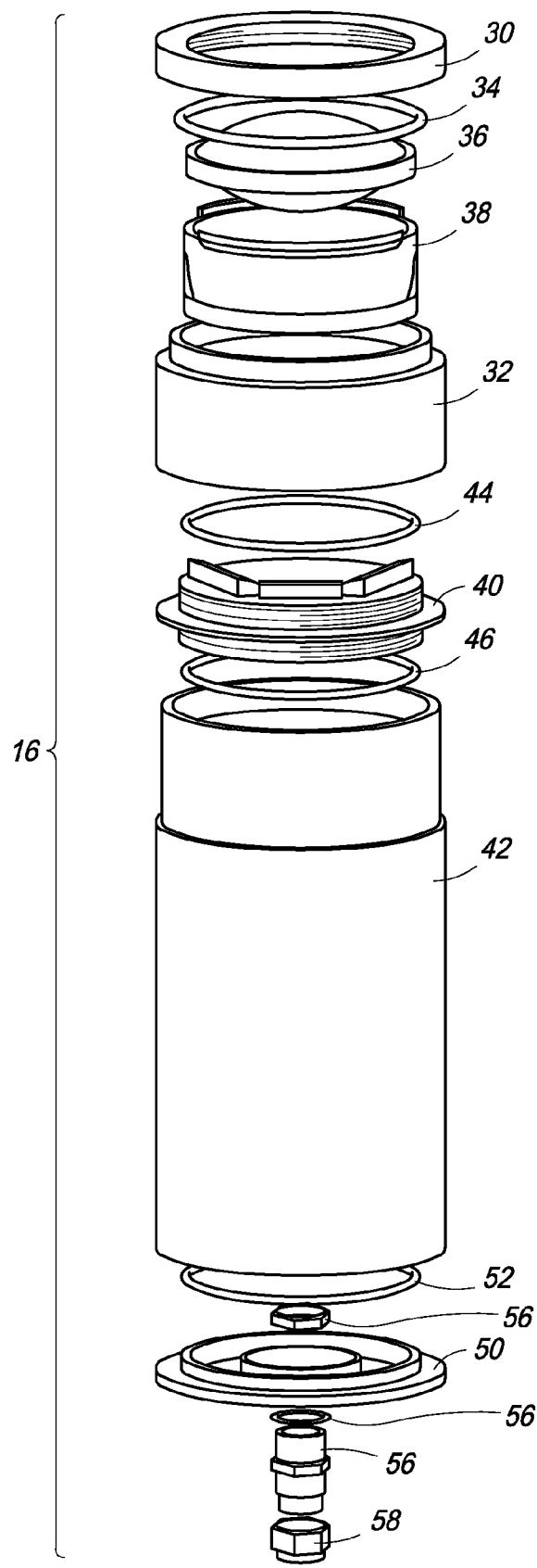
FIG. 3 is an exploded view of a light apparatus according to one embodiment.

Referring to FIG. 3, an exploded view of light apparatus 16 is shown according to one embodiment. The example arrangement includes a bezel 30 having interior threads which are configured to mate with exterior threads of a front housing 32 and an o-ring 34 forms a seal between front housing 32 and a lens 36. Lens 36 and lens support assembly 38 are provided within the front housing 32 and additional details regarding an example configuration of lens 36 are described below.

A centerplate assembly 40 includes upper and lower exterior threads which are configured to mate with interior threads within front housing 32 and a back housing 42. Plural o-rings 44, 46 provide respective seals of centerplate 40 assembly with respect to front housing 32 and back housing 42. Additional details regarding an example configuration of centerplate 40 are described below.

A tailcap 50 may be attached by screws to back housing 42 and o-ring 52 forms a seal therebetween in one embodiment. Centerplate assembly 40 and front and back housings 32, 42 are aluminum in one embodiment and which provide heat transfer from the light sources 70 to the surrounding environment via conduction, convection, and infrared radiation. Outer surfaces of front and back housings 32, 42 may further include fins to increase the surface area and provide increased heat transfer to the environment compared with arrangements which do not include fins.

Figure 4:
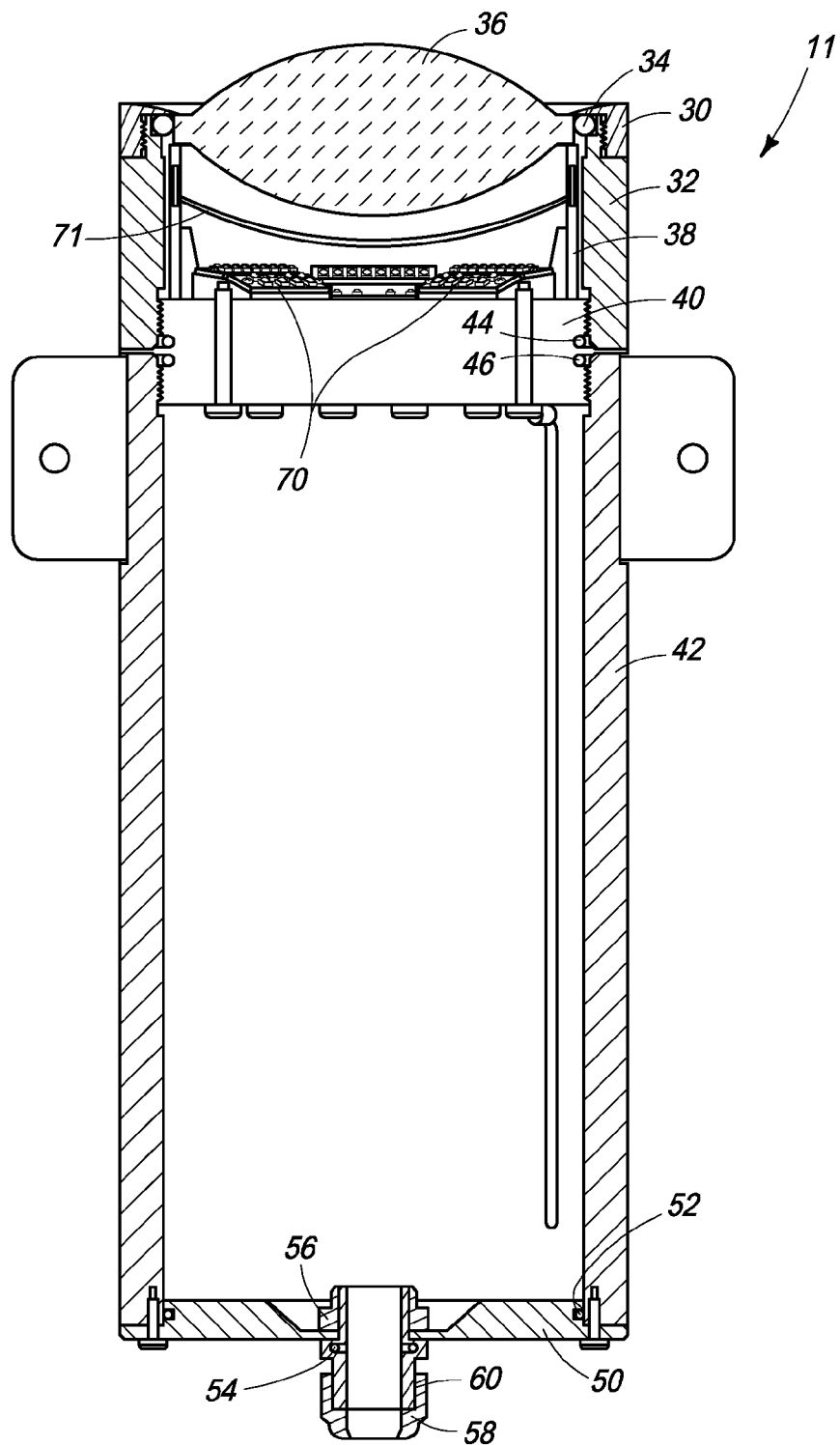
FIG. 4 is a cross-sectional view of a light apparatus according to one embodiment.

Referring to FIG. 4, a cross-sectional view of light apparatus 16 is shown according to one embodiment. In particular, bezel 30, front housing 32, centerplate assembly 40, back housing 42 and tailcap 50 provide a sealed interior compartment for housing a plurality of light sources 70 upon centerplate assembly 40 as well as driver power electronics and wire connections to the light sources 70 and an AC power input (not shown). The driver power electronics may be mounted outside of the interior compartment in another embodiment. As described in additional detail below, light sources 70 are individually configured to emit light towards lens 36 which collimates the received light and outputs the light towards the object 14 to be illuminated. Lens support assembly 38 is configured to receive and house a diffusor 71 in the illustrated embodiment. Additional details regarding lens 36, light sources 70 and diffusor 71 are described below.

As discussed above, some of the disclosed embodiments of lighting system 10 are configured to provide reduced spill light and light trespass and an increased coefficient of use compared with some conventional illumination arrangements. Lighting system 10 may be utilized in different applications to illuminate different objects, and accordingly, lighting system 10 may be configured differently in the different applications. Illustrative configurations of lighting system 10 and light apparatus 16 for illuminating example objects are discussed below and other configurations of lighting system 10 may be utilized to illuminate different objects.

In some embodiments, light apparatus 16 includes a plurality of light sources 70. The light sources 70 may be arranged in a particular geometry such that the light emitted from the light sources 70 illuminates, in combination with lens 36 in the described embodiment, respective different portions of a surface of an object 14 to be illuminated in one embodiment. In addition, different geometries of the light sources 70 and different configurations of lens 36 may be utilized to illuminate objects of different sizes and shapes in additional embodiments. In some embodiments, light sources 70 may be arranged in different groups to illuminate different respective regions of the object to be illuminated.

Light sources 70 are implemented as LEDs in some embodiments and are individually configured to primarily emit light in single direction (e.g., out of the center of an individual LED) which may be referred to as the primary direction of light emission for the individual light source 70. Light sources 70 may emit visible light, infrared radiation, or ultraviolet radiation in example embodiments. Light sources 70 implemented as LEDs may be XBD, XPG, XPE or MX-6S series white LEDs available from Cree, Inc. in one embodiments. In another embodiment, an XLamp XT-E Royal Blue LED may be utilized with a remote phosphor available from Intematix Corporation, which is injected or coated upon diffuser 71 and converts the blue light to white light. Other embodiments are possible.

One or more wires, such as wires providing power from an external supply, may enter the light apparatus 16 through an upper wire gland nut 56, wire gland o-ring 54, wire gland housing 60 and lower wire gland nut 58.

Figure 5:
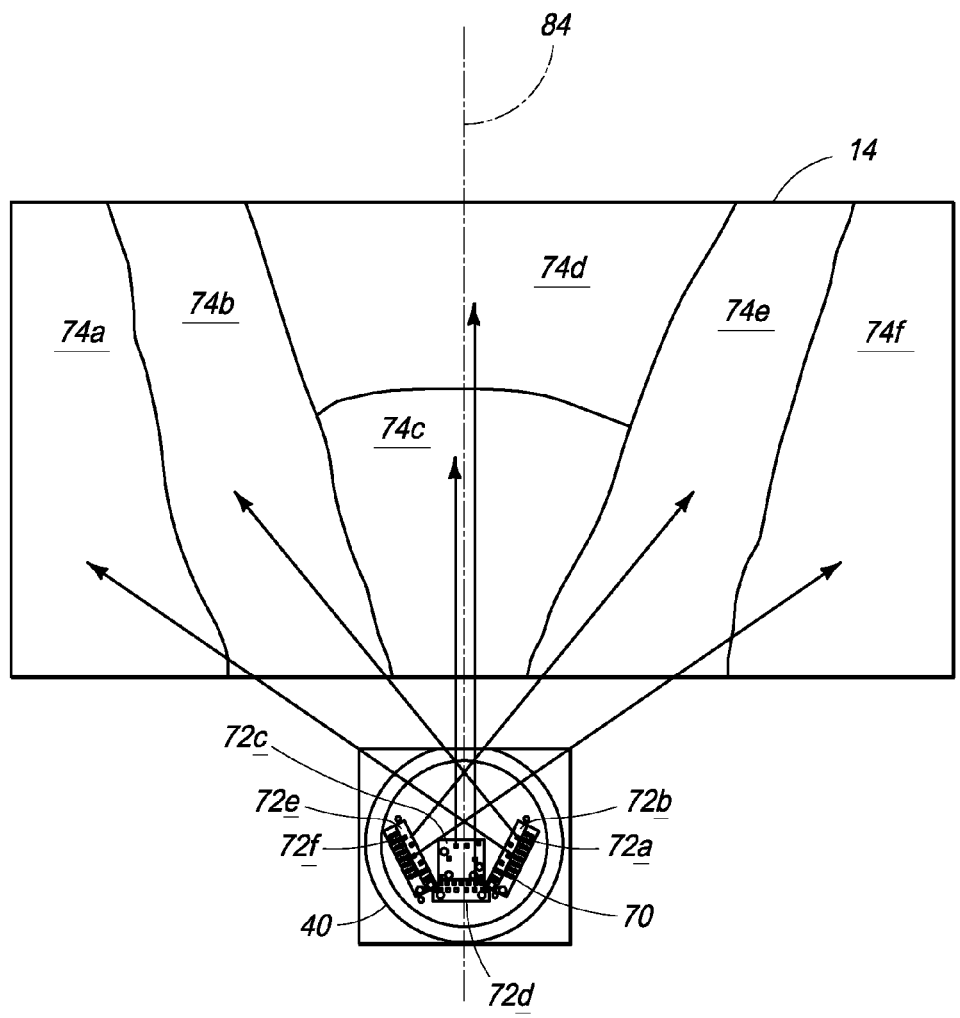
FIG. 5 is an illustrative representation of a light apparatus illuminating an example object according to one embodiment.

Referring to FIG. 5, an illustrative representation of an example arrangement of light sources 70 upon centerplate assembly 40 and a rectangular surface of an object 14 which is illuminated by the light sources 70 are shown. In the specific example of FIG. 5, the object 14 is a sign in the shape of a parallelogram (e.g., rectangle), such as a 12×24 ft billboard, and the light apparatus 16 is configured and positioned to illuminate an advertising surface of the billboard. In FIG. 5, the centerplate assembly 40 is shown for discussion purposes with respect to different regions of the advertising surface and it is to be understood that, while in use, the centerplate 40 is mounted to face the advertising surface such that light emitted from the light sources 70 thereon is directed towards the respective regions of the advertising surface.

In one embodiment, light apparatus 16 is configured such that light from individual light sources 70 illuminate a specific area of the object 14 to be illuminated and light from adjacent light sources 70 may overlap with one another. In addition, in some implementations, it is desired to provide substantially uniform illumination of a surface of the object 14, or in other words, the light intensity is roughly the same at all positions of the surface of the object 14 to be illuminated. In some billboard applications, it is desired to provide an illuminance of approximately 150 lx at each of the locations of the billboard advertising surface which is viewed by the public. However, in the example of FIG. 1, the lighting system 10 is positioned adjacent to the lower, central portion of the object 14 (e.g., billboard) and the light apparatus 16 is configured to direct light to other portions of the object 14 including the corners and upper portions of the object 14 as well as the portions adjacent and closer to the light apparatus 16.

As described below in some embodiments, some of the light sources 70 are spaced from the center axis of the lens 36. In addition, the light sources 70 are positioned corresponding to an input surface of the lens 36 in one embodiment. More specifically, the light sources 70 may be positioned to emit light directly at (e.g., substantially orthogonal to) an input surface of the lens 36 to reduce reflections of the emitted light in some embodiments discussed in additional detail below. In one embodiment, the light travelling in the primary directions of the respective light sources 70 impact the lens 36 at a plurality of different respective locations of the lens 36 and the lens 36 and placement of the light sources 70 with respect to the lens 36 are selected such that the light travelling in the primary directions from the light sources 70 are received at respective substantially orthogonal directions at the plurality of respective locations of the input surface of the lens 36.

In some example embodiments, the light sources 70 or arrays of light sources 70 are positioned in a x-y direction on a plane and at a certain distance from that plane and at a particular angle from the x axis and a particular angle from the y axis such that when positioned behind a collimating type lens, an approximately square, rectangular, trapezoidal, spot or flood shape is projected from the light apparatus 16. In the depicted example, the light sources 70 are arranged in a plurality of arrays or groups 72a-72f which are configured to illuminate a plurality of different respective regions 74a-74f of the advertising surface of the billboard. The geometrical arrangement of the groups 72a-72f of light sources 70 in combination with the configuration of lens 36 results in emitted light from the groups 72a-72f of light sources 70 being directed to the respective regions 74a-74f in the illustrated embodiment and as discussed in additional detail below. Although the majority of light emitted from the respective groups 72a-72f is directed towards the respective regions 74a-74f, there may be some overlap wherein some light emitted from one of the groups 72a-72f illuminates one of the adjacent regions 74a-74f (e.g., some light from group 72a illuminates region 74b).

In the depicted example, the groups 72a-72f of light sources 70 are generally adjacent to regions 74a, 74b, 74c, 74d, 74e, 74f, respectively. In some embodiments, the lens 36 is configured to direct light from one of the groups (e.g., light from group 72a) which is adjacent to region 74f to a different region (e.g., region 74a). In other words, lens 36 may direct light received from one side of the splicing plane 84 (described further below with respect to FIG. 6) to a region of the object 14 which is on the other side of the splicing plane 84 as shown in FIG. 5.

Figure 6:
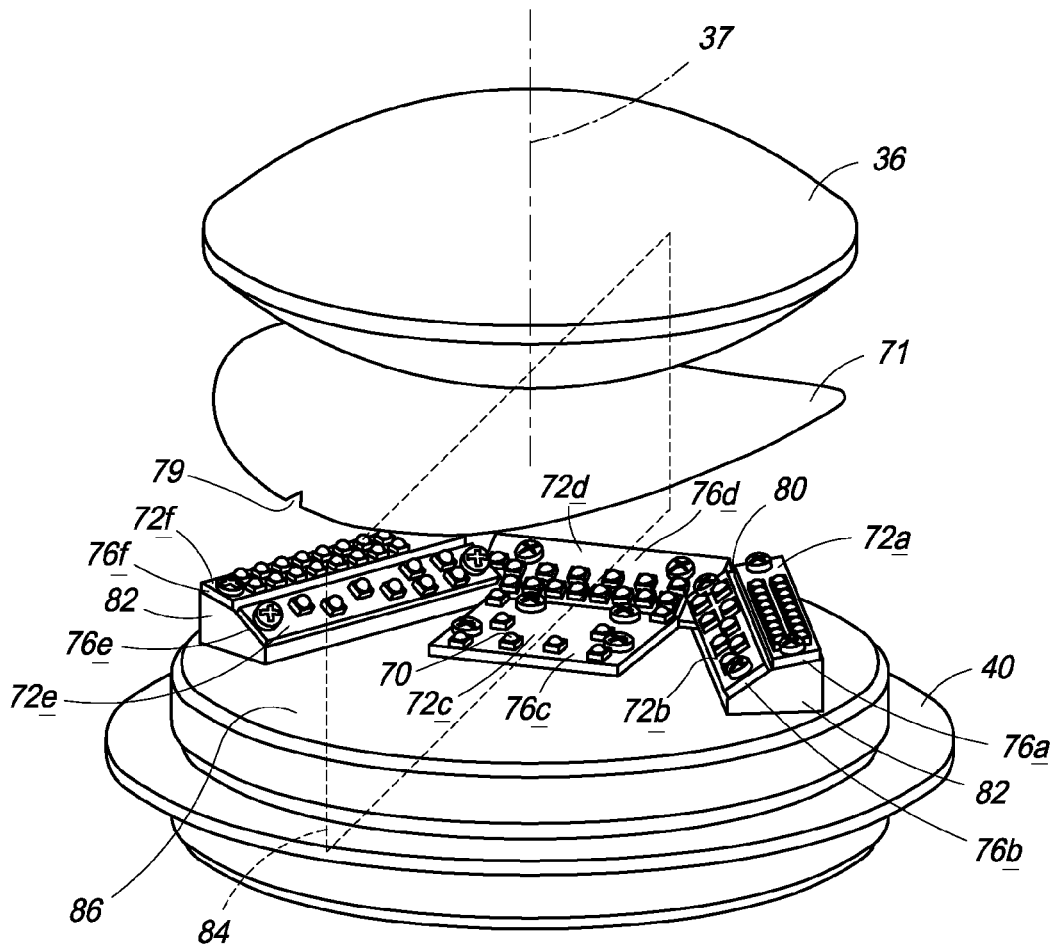
FIG. 6 is a perspective view of components of a light apparatus according to one embodiment.

The light sources 70 described in relation to the example light emission of FIG. 5 illuminate a rectangular shaped object 14 and are described in additional detail below with respect to FIG. 6. In particular, as discussed above, the light apparatus 16 may be mounted with respect to an object 14 to be illuminated at different distances from different regions of the object 14 to be illuminated (e.g., the light assembly 16 is mounted adjacent to a lower surface of a surface of a billboard to be illuminated in one embodiment). In this example embodiment, the light apparatus 16 is configured to emit a beam which has a shape different than the shape of the object 14 to be illuminated (e.g., rectangular surface). More specifically, the light apparatus of FIGS. 5-6 is configured to emit a substantially trapezoidal light beam from the lower surface of the rectangular object 14 to illuminate the rectangular surface of object 14 such that the emitted light from the lens 36 substantially corresponds to or is the same as the shape of object 14 when the light is received at the surface of the object 14 (e.g., the light has a substantially rectangular shape when the light is received at the surface of the sign). This described example embodiment may provide a light apparatus 16 having increased coefficient of use and reduced spill light and light trespass compared with some conventional arrangements as described herein.

Referring to FIG. 6, additional details regarding centerplate assembly 40 and arrangements of groups 72a-72f of light sources thereon to illuminate an example billboard object 14 are described according to one embodiment. The arrangement of FIG. 6 is configured to provide substantially constant illumination of a surface of the object 14 being viewed in one embodiment.

The example embodiment for illuminating a billboard includes centerplate 40 having a center block 80 and a plurality of edge blocks 82. Center block 80 and edge blocks 82 are configured to provide appropriate positioning of the light sources 70 relative to lens 36 to illuminate a desired object 14. The positioning of the light sources 70 relative to lens 36 and the configuration of lens 36 itself are selected such that individual light sources 70 of a given group 72a-72f illuminate a given spot within a respective region 74a-74f of the surface of the object 14 being illuminated. Due to the curvature of lens 36, the light sources 70 which are positioned towards the perimeter of centerplate 40 (and in the absence of blocks 80, 82) are positioned farther from the input surface of lens 36 compared with the light sources 70 positioned closer to a central axis 37 of lens 36. Center block and edge blocks 82 operate to lift the outer light sources 70 towards the center of lens 36 and provide desired angling of the centers of the light sources 70 towards the surface of lens 36.

In one embodiment, it is desired to have primary directions of light emission from the light sources 70 be substantially orthogonal to the input surface of lens 36 (i.e., the lower surface of lens 36 facing the light sources in FIG. 6) as discussed above. In the described example embodiment, the light sources 70 of the different groups 72a-72f are angled differently with respect to the common plane of the surface 86 of centerplate assembly 40 in attempts to provide the primary directions of light emissions of the light sources 70 as individually striking the input surface of lens 36 at a substantially orthogonal angle to reduce the amount of light reflected by the input surface of lens 36 which increases the efficiency of the light apparatus 16 wherein an increased amount of emitted light illuminates the object 14 compared with other designs where the emitted light is emitted in directions which are not orthogonal to an input surface of the lens. In one embodiment, the lens 36 and centerplate assembly 40 are configured such that the center axis 37 of the lens is substantially orthogonal to the upper surface 86 of centerplate assembly 40.

A slicing plane 84 is shown in FIG. 6 through the middle of centerplate assembly 40 and which bisects groups 72c, 72d of light sources 70 and with edge blocks 82 being symmetrical about the slicing plane 84 in the illustrated example embodiment. The upper surface 86 of centerplate assembly 40 may also be considered to define a neutral plane upon which the center and edge blocks 80, 82 are supported.

Light sources 70 may be mounted on a plurality of respective printed circuit boards 76a-76f corresponding to individual ones of the groups 72a-72f. For example, light sources 70 implemented as LEDs may be pick and placed onto boards 76a-76f implemented as aluminum clad circuit boards and reflow soldered in one embodiment. The LEDs are oriented flat against the boards 76a-76f such that the primary directions of light emission of the LEDs are substantially orthogonal to the boards 76a-76f in one embodiment. Boards 76a, 76b may be supported by the right edge block 82 and boards 76e, 76f may be supported by left edge block 82 in one embodiment. Board 76c may be mounted upon surface 86 and block 76d may be mounted upon center block 80 in one embodiment. Boards 72a-72f operate to transfer heat generated by the LEDs away from the LEDs to the centerplate assembly 40 in one embodiment.

Figure 7:
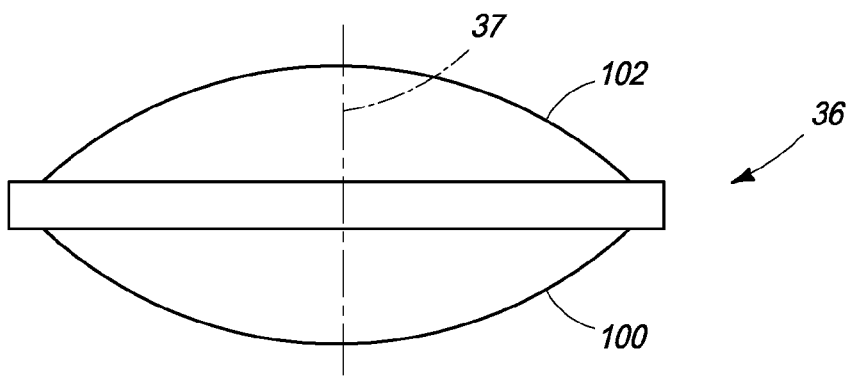
FIG. 7 is a side view of a lens of a light apparatus according to one embodiment.

Referring to FIG. 7, one configuration of lens 36 of the light apparatus 16 for providing the illumination described in FIG. 5 is shown. The illustrated lens 36 is a biconvex lens in the depicted example and includes an input surface 100 which is configured to receive light from light sources 70 and an output surface 102 which is configured to direct the light received from the light sources 70 towards an object which is to be illuminated. Lens 36 is configured to focus light (e.g., modify the effective beam angles) from the different light sources 70 to different locations of a surface of the object 14 being illuminated to provide substantially uniform light across the illuminated surface of the object 14 in one embodiment. The orientation and position of the light sources 70 under the lens 36 and the configuration of lens 36 (e.g., focusing of the received light) cause the light from each light source 70 to travel at a unique trajectory angle from the lens 36 to illuminate respective, unique locations of the illumination target. Lens 36 may be fabricated of a monolithic piece of glass or plastic as a single lens or as two single convex lens which are coupled together in example embodiments. An antireflective coating is applied to the lens 36 in one embodiment in order to decrease the amount of light which is reflected off of the smooth input surface 100 of the lens 36.

In one embodiment, the convex input and output surfaces 100, 102 of lens 36 each have a radius of approximately 72.16 mm, a diameter of the input (or output) surface of approximately 90.53 mm, and an overall diameter of approximately 99.67 mm. As described above, diffusor 71 may be used to diffuse the light and have an elliptical shape such that the shape of the diffusor 71 is curved and substantially corresponds to the curve of input surface 100 of lens 36 when installed within lens support assembly 38 and the diffusor 71 has a diameter of approximately 94.615 mm in one embodiment. Diffusor 71 may include notches 79 to align the diffusor 71 within groove within an interior wall of support assembly 38. Similar to input surface 100 of lens 36, it is desired in one embodiment to position diffusor 71 with respect to light sources 70 such that light sources 70 emit light directly at (e.g., orthogonal to) the diffusor 71 to reduce reflections of the emitted light. A suitable diffuser 71 is a C series C-HE15 available from BrightView Technologies. Diffuser 71 may be positioned approximately 12 mm above light sources 70 in one embodiment. Diffuser 71 may be received between ridges on the interior surface of lens support assembly 38 in one implementation.

In one embodiment, an interior surface of lens support assembly 38 may be coated with a reflective coating to improve recirculation efficiency, and accordingly, the efficacy of the light apparatus 16 by reflecting light which has been reflected off of the surfaces of the various parts of the disclosed apparatus or light which has been emitted directly from the light sources 70. In one embodiment, the reflective coating may be provided by vacuum metallization.

Light sources 70 implemented as LEDs individually emit light at a particular spatial distribution which describes the intensity of the emitted light for a given angle from the LED. The spatial distribution is sometimes simplified by referring to it as the viewing angle which is generally defined as the angle where the emitted light intensity is half the maximum emitted light intensity. Light strikes the diffuser 71 at a particular angle. A portion of this light changes angle as it travels through the diffuser 71. Hence, the effective spatial distribution and therefore viewing angle of the LED is modified as light from it travels through the diffuser 71. This diffused light appears more broad and smooth on the illumination target. Additionally, the diffuser 71 widens quasi-collimated light beams from the light sources 70 and reduces the chromatic aberration that can occur as broadband light composed of many frequencies travels through the lens 36 and is bent at slightly different angles depending on frequency.

Figure 8:
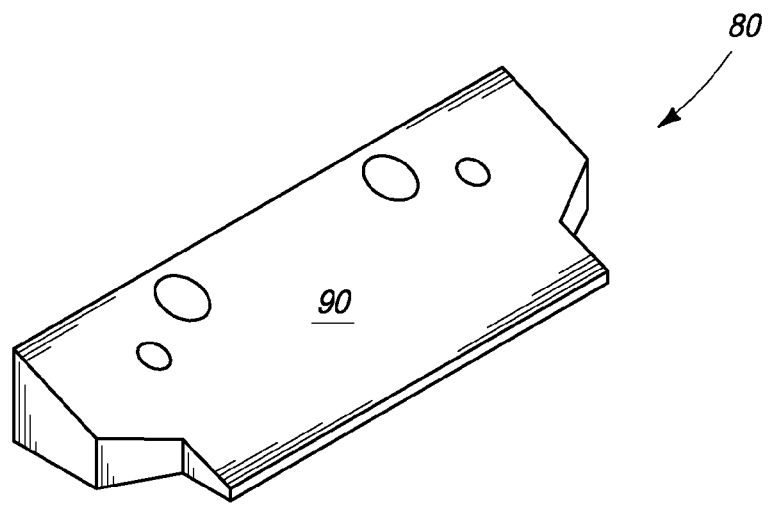
FIG. 8 is a perspective view of a center block according to one embodiment.
Figure 9:
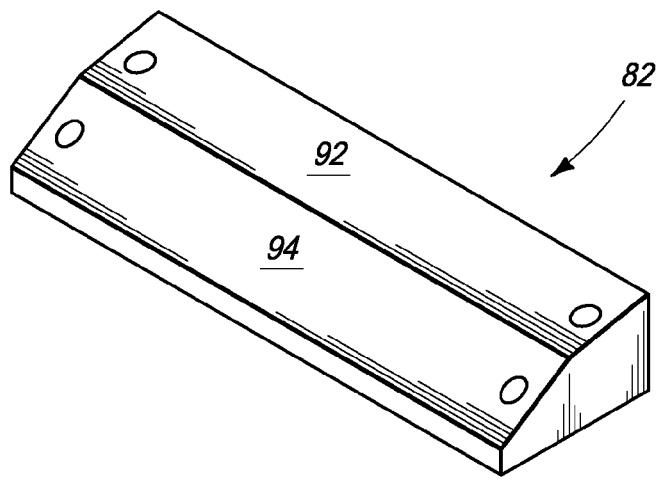
FIG. 9 is a perspective view of an edge block according to one embodiment.

Referring to FIGS. 8 and 9 as well as FIGS. 6-7, additional details regarding an embodiment of lighting system 10 which is configured to generate the light distribution shown in the example of FIG. 5 are described. In one embodiment, center block 80 is angled 90 degrees with respect to the slicing plane 84 and edge blocks 82 are each angled 27 degrees with respect to the slicing plane 84.

Referring to FIG. 8, center block 80 includes an upper surface 90 which is configured to support board 76d and is configured to angle the light sources 70 thereon towards the central axis 37 at approximately 23.66 degrees relative to surface 86.

Referring to FIG. 9, details of left and right edge blocks 82 are shown. Each edge block 82 includes a first surface 92 which is angled at 11.413 degrees relative to surface 86 and is configured to support one of boards 76a, 76f and a second surface 94 which is angled at 33.037 degrees relative to surface 86 and is configured to support one of boards 76b, 76e. This example described arrangement provides the light sources approximately 20 mm away from an input surface 100 of the lens 36. The centerplate 40 and blocks 80, 82 are aluminum and operate to conduct heat away from light sources 70 in one embodiment.

Additional details regarding the light sources 70 are described below according to illustrative embodiments. For example, groups 72a and 72f are identical to one another and each includes two series strings of light sources 70 in one embodiment. More specifically, each string includes eight light sources (e.g., LEDs) in series with a resistor having a common value. In addition, groups 72b and 72e are identical to one another and each includes a series string of light sources 70 including eight light sources (e.g., LEDs) in series with a resistor having a common value. Group 72c includes eight series connected light sources 70 in series with a resistor and group 72d includes two series strings of light sources 70 individually including eight light sources (e.g., LEDs) in series with a resistor having a common value. Each board 76a-76f has solder pads which are electrically connected with the driver power circuitry in one embodiment.

Figure 10:
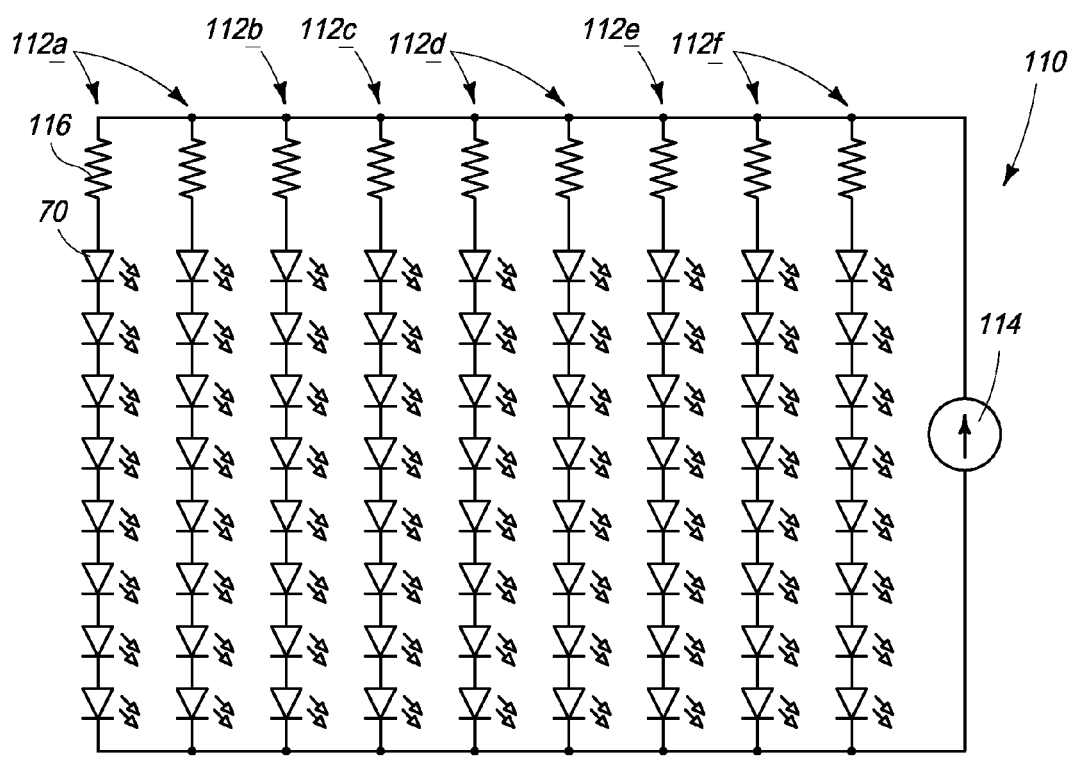
FIG. 10 is a schematic illustration of circuitry of the lighting system according to one embodiment.

Referring to FIG. 10, one embodiment of circuitry 110 of the lighting system 10 is shown. The example circuitry includes a plurality of strings 112a-112f which correspond to respective groups 72a-72f of light sources 70. The currents applied to the strings 112a-112f may be tailored to adjust the brightness of corresponding locations on the targets which are illuminated by the respective strings 112a-112f and to provide substantially uniform illumination of the target in one embodiment.

As shown in the example embodiment, the individual strings 112a-112f are each coupled in series with a respective resistor 116 and in parallel with driver power circuitry 114. In one embodiment, resistors 116 for strings 112a, 112d, 112f may each be 0.39 Ohms (providing a current of approximately 341 mA for each respective light source 70), resistors 116 for strings 112b, 112e may each be 0.82 Ohms (providing a current of approximately 322 mA for each respective light source 70), and resistor 116 for string 112c may be 1.1 Ohms (providing a current of approximately 312 mA for each respective light source 70) in one embodiment. Values of respective resistors 116 may be varied in different strings 112a-112f to provide light of different intensities from the respective groups 72a-72f of light sources 70 in one embodiment. In one embodiment, the power driver circuitry 114 provides an operational voltage of 25.65 V and a current of 3 A. The example configuration has an approximate input power of 85 W and an output power of 77 W.

While a specific embodiment of the lighting system 10 which is configured to illuminate an advertising surface of a object 14 in form of a billboard is shown, different configurations of lighting system 10 are possible for illuminating other objects. The lighting system 10 may be modified in other embodiments (e.g., with different geometries of light sources 70, different intensities of light from one or more of sources 70, and/or different configurations of lens 36) to generate beams of different shapes and to illuminate different objects having different target surfaces and/or from different locations relative to the object surfaces being illuminated in other embodiments.

Figure 11:
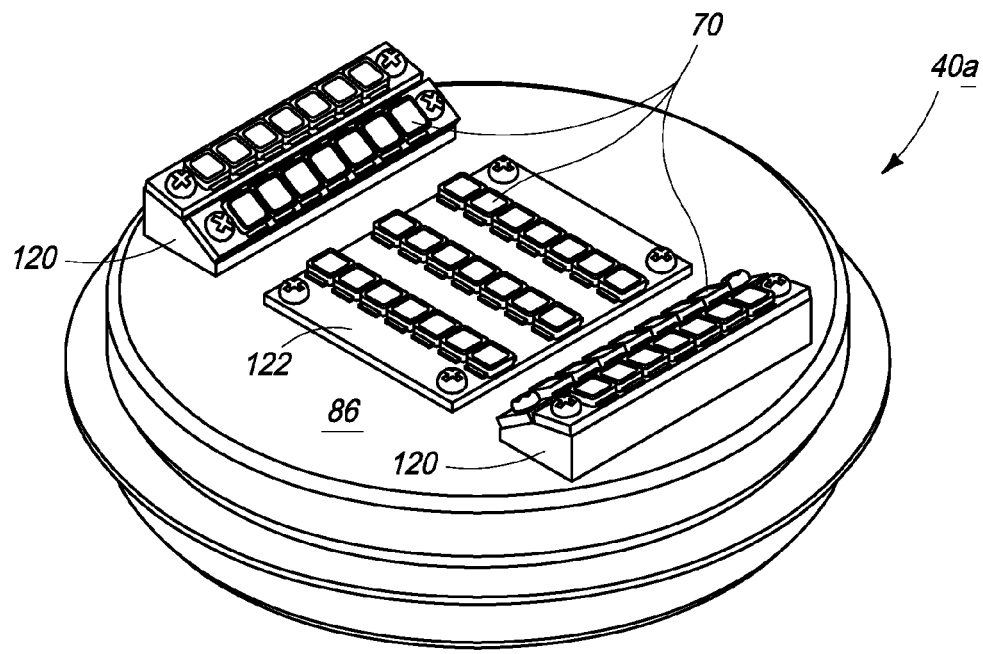
FIG. 11 is a perspective view of components of a light apparatus according to one embodiment.

Referring to FIG. 11, one additional embodiment of centerplate assembly 40a is shown for emitting a substantially rectangular beam shape. Plural edge blocks 120 are shown in the example arrangement of FIG. 11 for individually supporting two groups of light sources 70 while an additional group of light sources 70 is provided upon a board 122 which is substantially coplanar with surface 86 of assembly 40a.

Figure 12:
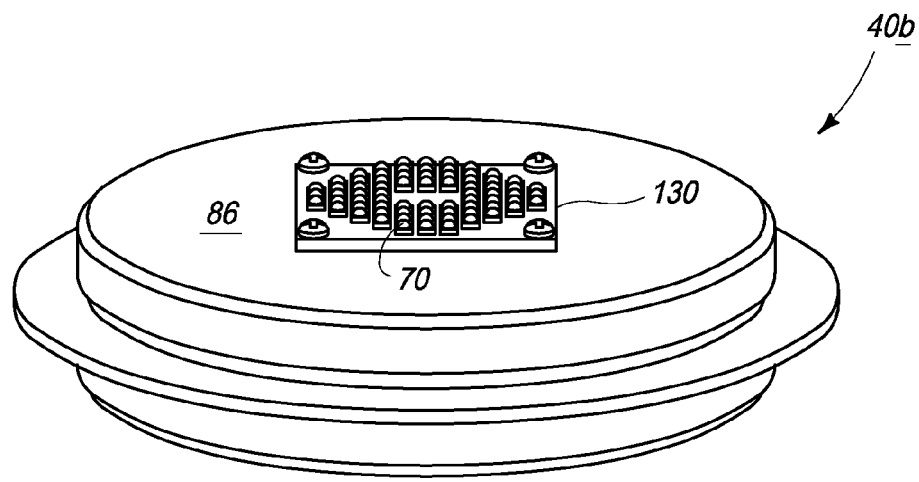
FIG. 12 is a perspective view of components of a light apparatus according to one embodiment.

Referring to FIG. 12, an additional embodiment of centerplate assembly 40b is shown for emitting a relative narrow round beam shape. A single group of light sources 70 are arranged in substantially a ring arrangement upon a board 130 which is substantially coplanar with surface 86 of assembly 40b. These illustrative embodiments are examples and other configurations of light apparatus 16 are possible.

Figure 13:
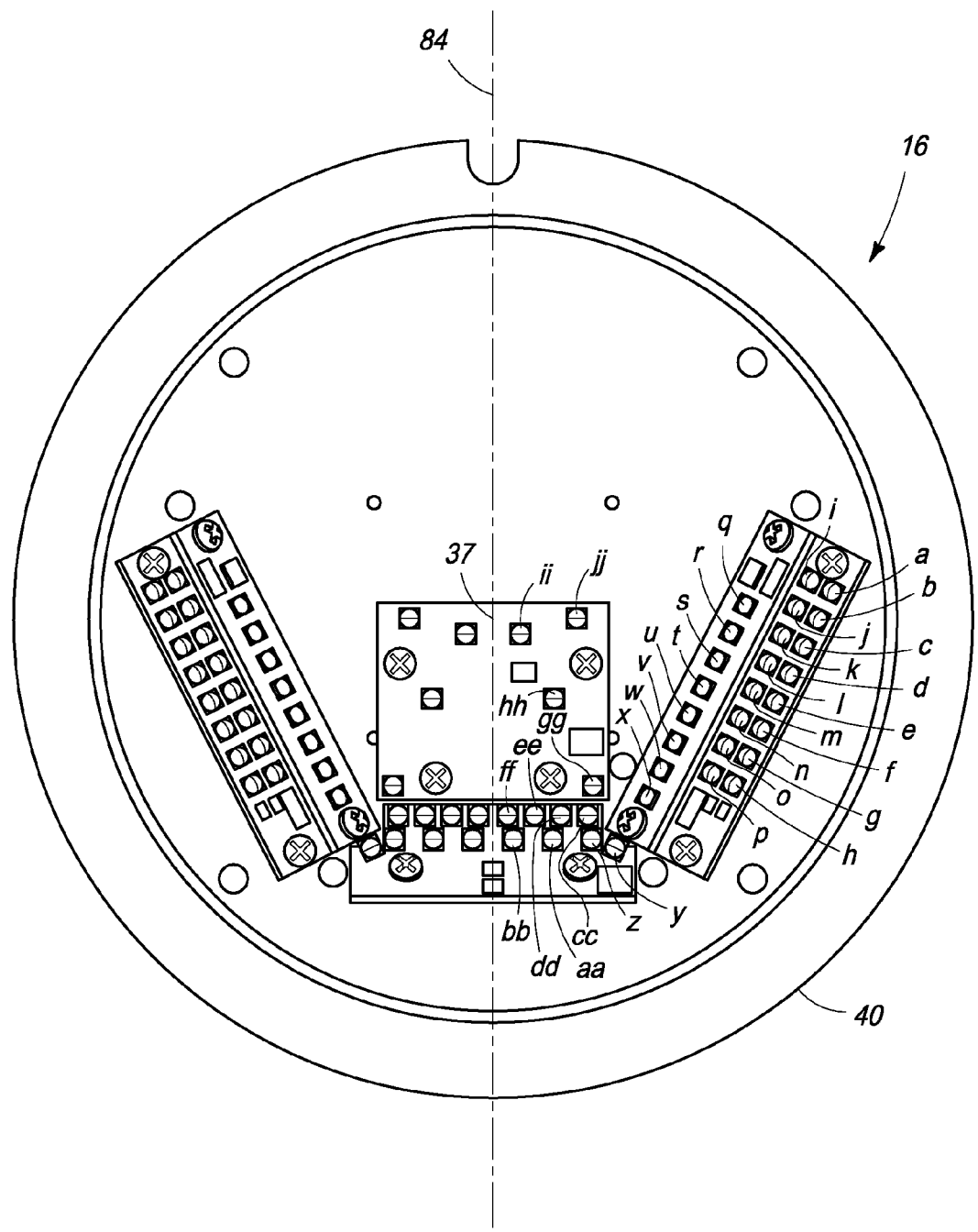
FIG. 13 is a top view of a centerplate assembly according to one embodiment.
Figure 14:
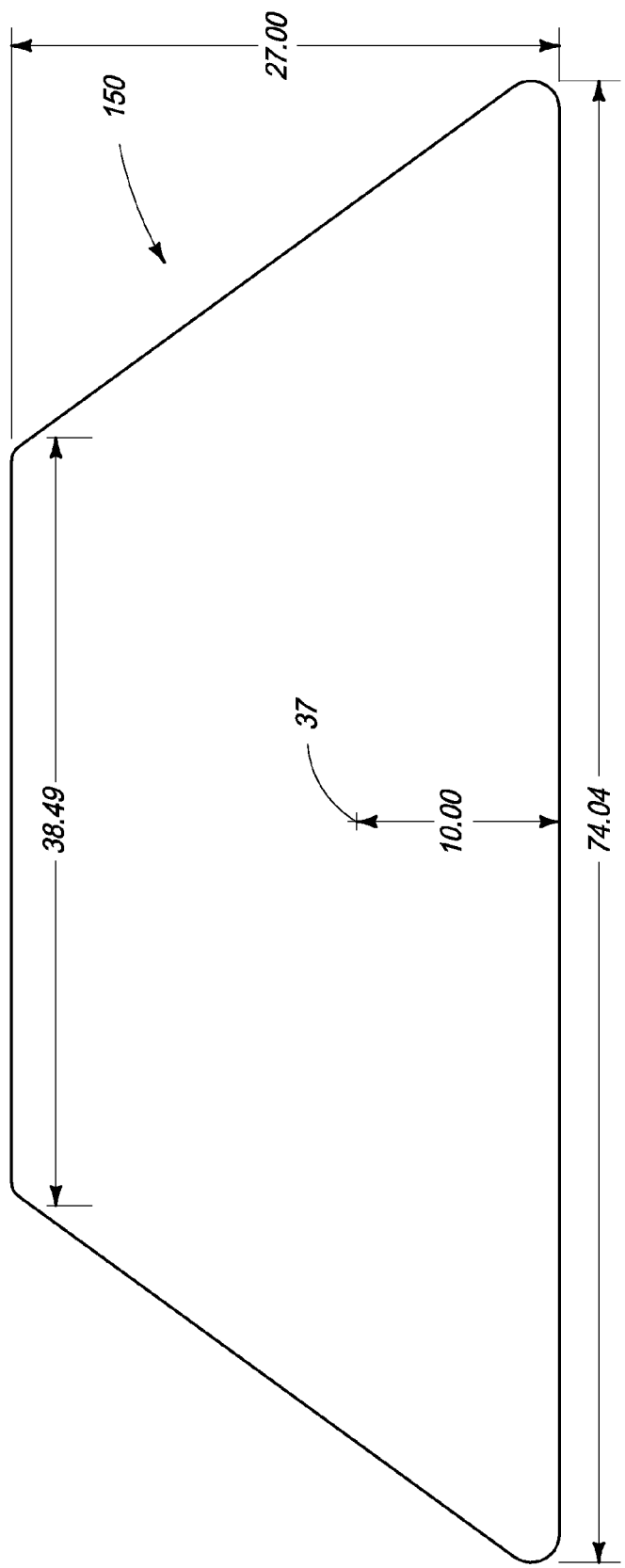
FIG. 14 is an illustration of a trapezoidal shaped light beam emitted from a light apparatus according to one embodiment.

Referring to FIG. 13, an example view is shown of one embodiment of a centerplate assembly 40 having one possible arrangement of light sources 70 thereon to generate a trapezoidal light beam shown in FIG. 14. Table A below provides distances in millimeters from the position of the respective light sources 70 to the center axis 37 of lens 36. In the illustrated example embodiment, the light sources 70 are symmetrical about plane 84 and the light sources 70 on the left side of plane 84 have the same distances relative to the center axis 37 of lens 36 as the corresponding light sources 70 on the right side of the plane 84. Other embodiments are possible.

TABLE A

| Light Source | Distance (mm) |
| --- | --- |
| 72a | 44.3 |
| 72b | 42.2 |
| 72c | 40.5 |
| 72d | 39.1 |
| 72e | 38.2 |
| 72f | 37.6 |
| 72g | 37.5 |
| 72h | 37.8 |
| 72i | 41.6 |
| 72j | 39.4 |
| 72k | 37.6 |
| 72l | 36.1 |
| 72m | 35.0 |
| 72n | 34.4 |
| 72o | 34.3 |
| 72p | 34.7 |
| 72q | 32.4 |
| 72r | 30.5 |
| 72s | 29 |
| 72t | 28.1 |
| 72u | 27.7 |
| 72v | 28.0 |
| 72w | 28.8 |
| 72x | 30.2 |
| 72y | 33.5 |
| 72z | 31.1 |
| 72aa | 29.3 |
| 72bb | 28.4 |
| 72cc | 28 |
| 72dd | 26.6 |
| 72ee | 25.7 |
| 72ff | 25.2 |
| 72gg | 25.3 |
| 72hh | 13 |
| 72ii | 3.9 |
| 72jj | 11 |

Referring to FIG. 14, an example of a light pattern 150 formed on a flat wall from a light beam emitted from the light apparatus 16 of FIG. 4 having the arrangement of light sources 70 described above with respect to FIG. 13 is shown. The illustrated trapezoidal shaped light pattern 150 was obtained by positioning the center axis 37 of lens 36 orthogonal to the flat wall and lens 36 16 inches from the wall. The indicated dimensions of the light pattern 150 are in inches. As discussed above, this light beam, when received at the target surface of an example billboard, corresponds to the perimeter of the rectangular surface of the billboard when the light beam is emitted from the center, lower side of the surface and which results in reduced light pollution, spill light and light trespass compared with some conventional arrangements.

Some of the example light apparatuses 16 described herein provide relatively high efficacy such that a reduced amount of electricity is used to adequately illuminate the target compared with some arrangements. Use of LEDs in some embodiments provide long life which results in lower maintenance costs and therefore lower life-cycle costs in comparison to conventional lighting systems which use HID where the bulbs degrade and have to be replaced much more frequently.

In addition, a very high percentage of light produced by some of the example embodiments hits the illumination target and therefore a low percentage of light is lost to the surroundings. Additionally, less light needs to be produced overall because only a small amount of light does not hit the intended target which results in very low light pollution and light trespass in some embodiments.

Some of the described embodiments provide light apparatuses which cast a substantially uniform light pattern to adequately illuminate the edges of a target as well as center portions of the target. In some embodiments, energy is saved by not over-illuminating the center of the illumination target and the light reflected from these over-lit areas contributes less to light pollution and trespass.

Some embodiments of light apparatus 16 utilize a relatively small round luminaire housing shape which makes it possible build a fixture which is simple and inexpensive to manufacture while still meeting illumination requirements of various applications. Because of the small size in such embodiments, the cross-section of the fixture is low which results in lower wind loads. The small size is also less obtrusive to viewers where the light fixture is positioned between the viewer and the object to be viewed. Furthermore, if the light is mounted on the top of the billboard, the resulting shadow cast by the sun onto the billboard in daytime is smaller. Also, the weight in comparison to conventional fixtures may be significantly less resulting in less expensive and simpler mounting methods and easier installation and maintenance.

The small size and weight of some embodiments also have advantages in scene lighting where the light fixture may need to be portable. An example application of scene lighting is in the use of a light by fire fighters, emergency responders or police at the scene of an accident, fire, or investigation. The light systems 10 may be for scene or target lighting where the emitted light can be visible, infrared, or ultraviolet in example embodiments.

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

Further, aspects herein have been presented for guidance in construction and/or operation of illustrative embodiments of the disclosure. Applicant(s) hereof consider these described illustrative embodiments to also include, disclose and describe further inventive aspects in addition to those explicitly disclosed. For example, the additional inventive aspects may include less, more and/or alternative features than those described in the illustrative embodiments. In more specific examples, Applicants consider the disclosure to include, disclose and describe methods which include less, more and/or alternative steps than those methods explicitly disclosed as well as apparatus which includes less, more and/or alternative structure than the explicitly disclosed structure.

What is claimed is:

1. A light apparatus comprising: a plurality of light sources individually configured to emit light in a respective primary direction, and wherein the light sources are configured such that the primary directions of the light emitted by the light sources are at different angles with respect to a common plane; a lens configured to direct the light from the light sources to a surface of an object which is to be illuminated; and wherein the light sources are arranged in a plurality of groups, and the light emitted from different ones of the groups only illuminate respective different regions of the object.

2. The apparatus of claim 1 wherein the lens has a central axis, and the common plane is substantially orthogonal with respect to the central axis of the lens.

3. The apparatus of claim 1 wherein the lens has an input surface wherein the light from the light sources is received, and the angles of the primary directions of the light emitted by the light sources correspond to the input surface of the lens.

4. The apparatus of claim 3 wherein the input surface of the lens is curved and the light sources are configured to provide the light in respective primary directions which are substantially orthogonal to the input surface of lens.

5. The apparatus of claim 1 wherein the object is a sign, and further comprising a mount configured to support the light apparatus adjacent to a side of the sign in a position to illuminate a surface of the sign.

6. The apparatus of claim 1 wherein the object is a sign and the lens is configured to emit the light from the light sources in a shape which is different than a shape of a surface of the sign to be illuminated.

7. The apparatus of claim 6 further comprising a mount configured to support the light apparatus in a position relative to the surface of the sign such that the light emitted from the lens substantially corresponds to the shape of the surface of the sign when the light is received at the surface of the sign.

8. The apparatus of claim 1 wherein the lens comprises a first convex surface configured to receive light from the light sources and a second convex surface configured to output the light towards the object.

9. The apparatus of claim 1 wherein the groups of the light sources are positioned adjacent to different regions of the object to be illuminated, and the lens is configured to receive the light from the lights sources of one of the groups which is located adjacent to a first of the regions of the object and to direct the light to a second of the regions of the object which is different than the first of the regions of the object.

10. A light apparatus comprising: a plurality of light sources individually configured to emit light in a respective primary direction; a lens comprising: a curved input surface which is configured to receive the light from the light sources; and an output surface which is configured to direct the light from the light sources to a surface of an object which is to be illuminated; wherein the primary directions of the light emitted by at least some of the light sources are substantially orthogonal to a plurality of different locations of the curved input surface of the lens; and wherein the light sources are arranged in a plurality of groups, and the lens is configured to direct the light emitted from the different groups to respective different regions of the surface of the object which is to be illuminated.

11. The apparatus of claim 10 wherein the light sources are arranged at a plurality of different angles relative to a common plane which is orthogonal to a central axis of the lens.

12. The apparatus of claim 10 wherein the light sources are located at a plurality of different locations and light emitted in the respective primary directions of the light sources are received at different locations of the curved input surface of the lens.

13. The apparatus of claim 10 wherein the input and output surfaces are each a convex surface.

14. A lighting system comprising: a light apparatus configured to emit light in a defined shape which is different than a shape of a surface of an object which is to be illuminated, wherein the light apparatus comprises: a plurality of light sources arranged in a plurality of different groups; and a lens configured to receive light emitted from the light sources of the different groups and configured to direct the light of the different groups to respective different regions of the surface of the object which is to be illuminated; and a mount configured to position the light apparatus with respect to the surface of the object which is to be illuminated such that the shape of the light which is emitted from the light apparatus substantially corresponds to the shape of the surface of the object when the light is received at the surface of the object.

15. The system of claim 14 wherein the defined shape of the light emitted from the light apparatus is a trapezoid and the shape of the surface of the object is a parallelogram.

16. The system of claim 14 wherein the object is a sign, and the light apparatus is positioned to illuminate a surface of the sign from the same side from which the signed is viewed.

17. The system of claim 14 wherein the object is a sign, and further comprising a mount configured to support the light apparatus adjacent to a side of the sign in a position to illuminate a surface of the sign.

18. The apparatus of claim 1 further comprising a diffuser configured to widen the light emitted by individual ones of the light sources.

19. The apparatus of claim 18 wherein an input surface of the diffuser is curved and the primary directions of the light emitted by at least some of the light sources are orthogonal to a plurality of different locations of the curved input surface of the diffuser.

20. The apparatus of claim 6 wherein the shape of the light emitted from the lens is a trapezoid and the shape of the surface of the object is a parallelogram.

21. The apparatus of claim 1 wherein the light sources are configured such that the primary directions of the light emitted by the light sources are aimed directly at different locations of a curved input surface of the lens.

22. The apparatus of claim 1 wherein the light sources are configured such that the primary directions of the light emitted by the light sources provide reduced reflections at different locations of a curved input surface of the lens compared with other primary directions of the light emitted by the light sources.

23. The apparatus of claim 1 wherein the different angles of the primary directions of the light emitted by the light sources are selected corresponding to a curved input surface of the lens.

24. The apparatus of claim 10 wherein the primary directions of the light emitted by a plurality of the at least some light sources are orthogonal to respective ones of the different locations of the curved input surface of the lens.

25. The apparatus of claim 24 wherein the plurality of the at least some light sources are spaced apart from one another.

26. A light apparatus comprising: a plurality of light sources individually configured to emit light in a respective primary direction, and wherein the light sources are configured such that the primary directions of the light emitted by the light sources are at different angles with respect to a common plane; a lens configured to direct the light from the light sources to a surface of an object which is to be illuminated; a diffuser configured to widen the light emitted by individual ones of the light sources; and wherein an input surface of the diffuser is curved and the primary directions of the light emitted by at least some of the light sources are orthogonal to a plurality of different locations of the curved input surface of the diffuser.

* * * * *